United States Patent
Huang

[11] Patent Number: 6,134,791
[45] Date of Patent: Oct. 24, 2000

[54] HACKSAW HAVING BLADE TENSION ADJUSTING MECHANISM

[76] Inventor: Yin Han Huang, P.O. Box 63-99, Taichung, Taiwan

[21] Appl. No.: 08/958,619

[22] Filed: Oct. 27, 1997

[51] Int. Cl.[7] .................................................. B27B 21/02
[52] U.S. Cl. .............................................. 30/513; 30/506
[58] Field of Search .............................. 30/507, 513, 514, 30/517, 506

[56] References Cited

U.S. PATENT DOCUMENTS

| | | | |
|---|---|---|---|
| 3,636,997 | 1/1972 | Keymer | 30/513 |
| 3,822,731 | 7/1974 | Keymer | 30/513 |
| 4,256,156 | 3/1981 | Biszantz et al. | 30/513 |
| 4,466,471 | 8/1984 | Thomson | 30/517 |

FOREIGN PATENT DOCUMENTS 30810  7/1960  Finland ..................................... 30/513

*Primary Examiner*—Hwei-Siu Payer

[57] ABSTRACT

A hacksaw includes a frame and a handle. A lever is pivotally coupled to the handle. A link has a rear end pivotally secured to the bottom portion of the lever. A blade is secured between the link and the frame and is secured in place when the lever is rotated to engage with the handle and is released when the lever is disengaged from the handle. A latch may secure the lever to the handle when the lever secures the blade in place. A bolt is threadedly engaged with the lever and the link for moving the link relative to the lever and for adjusting the blade tension when the lever secures the blade in place.

7 Claims, 3 Drawing Sheets

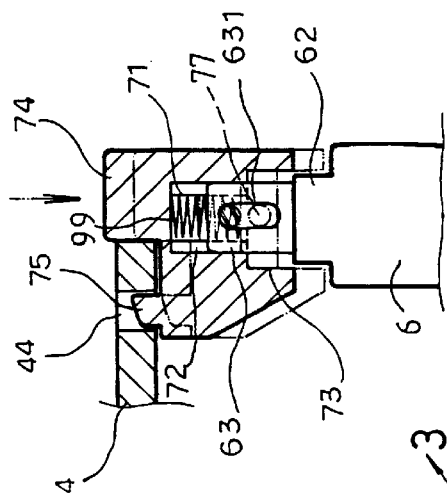
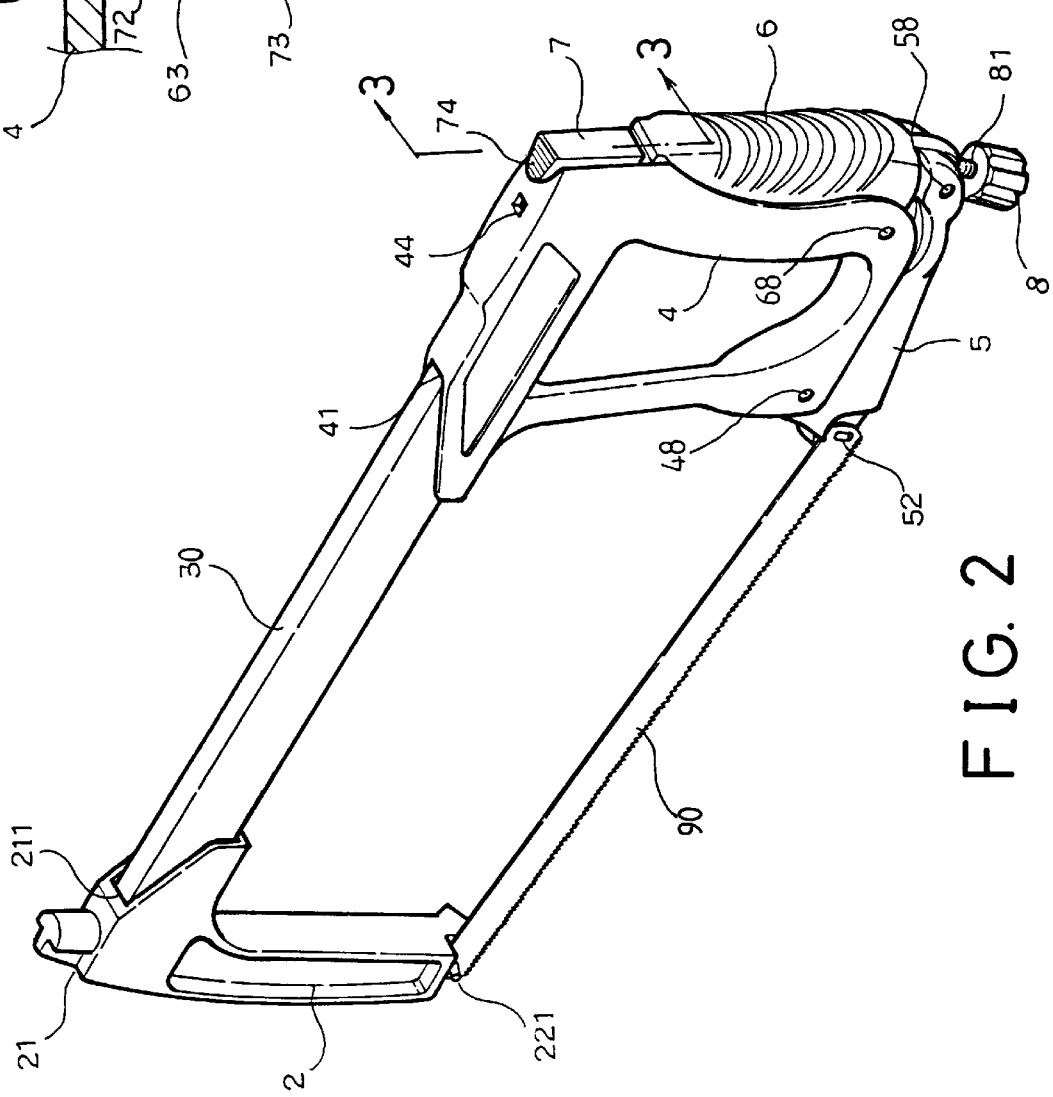

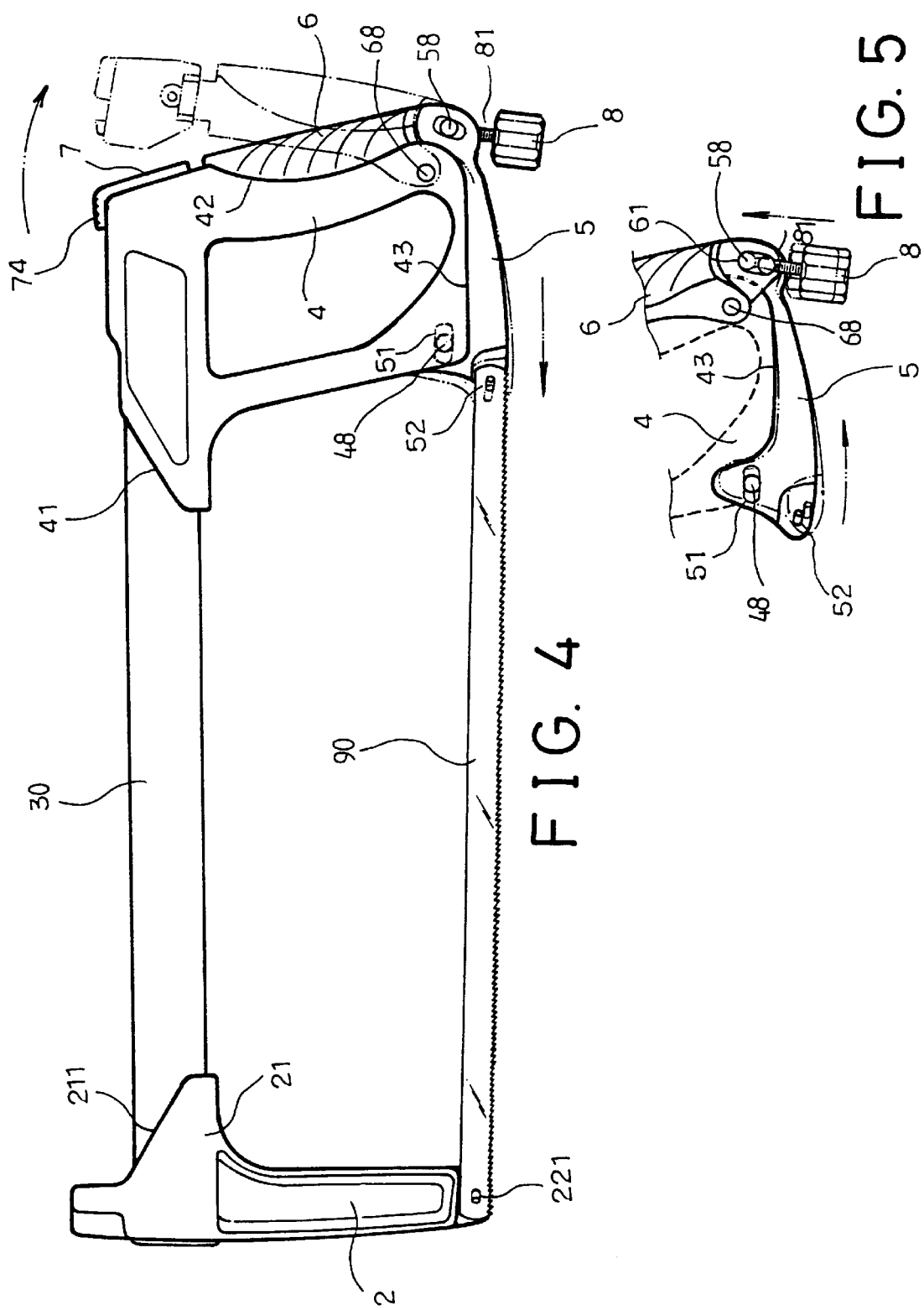

HACKSAW HAVING BLADE TENSION ADJUSTING MECHANISM

BACKGROUND OF THE INVENTION

1. Field of the Invention

The present invention relates to a hacksaw, and more particularly to a hacksaw having a mechanism for easily adjusting the blade tension.

2. Description of the Prior Art blade tension. However, the blade tension adjusting mechanism may not be operated once the quick release mechanism secure the blade in place. The user have to release the quick release mechanism and adjust the blade tension by trial and error method before the quick release mechanism may secure the blade to the hacksaw. The quick release mechanism should be secured in place and moved to release the blade again and again until the blade is adjusted to the suitable tension.

The present invention has arisen to mitigate and/or obviate the afore-described disadvantages of the conventional saw blade adjusting devices.

SUMMARY OF THE INVENTION

The primary objective of the present invention is to provide a hacksaw which includes a mechanism for easily adjusting the blade tension when the blade is secured in place.

In accordance with one aspect of the invention, there is provided a hacksaw comprising a body including a front portion having a frame and a rear portion having a handle, the frame including a bottom portion, the handle including a bottom portion and an upper portion and a rear portion, a lever including a lower portion pivotally coupled to the bottom portion of the handle at a shaft and including an upper portion and a bottom portion, a link including a first end pivotally secured to the bottom portion of the lever at a rod and including a second end, a blade secured to the second end of the link and the bottom portion of the frame, the blade being secured in place when the lever is rotated about the shaft to engage with the rear portion of the handle and the blade being released when the lever is disengaged from the rear portion of the handle, means for securing the upper portion of the lever to the handle and for securing the blade in place, and means for moving the link relative to the lever for adjusting a blade tension of the blade when the lever secures the blade in place.

The bottom portion of the lever includes an oblong hole for slidably engaging with the rod, the link moving means includes a forcing means for forcing the rod along the oblong hole and for adjusting the blade tension of the blade. The rod forcing means includes a bolt threadedly engaging with the bottom portion of the lever and engaged with the rod for moving the rod along the oblong hole.

The bottom portion of the handle includes a pole, the link includes an oblong hole for slidably engaging with the pole of the handle and for limiting a relative movement of the link relative to the handle and for preventing the link from being disengaged from the handle.

The lever securing means includes a slide slidably engaged on the upper portion of the lever, and means for biasing the slide to engage with the handle and for securing the lever to the handle. The lever includes an ear extended upward, the handle includes an aperture, the slide includes a latch for engaging with the aperture of the handle and includes a slot for slidably engaging with the ear of the lever, the biasing means is engaged between the ear and the slide for biasing the projection to engage with the aperture and for securing the lever to the handle. The ear of the lever includes an oblong hole, the slide includes a pin secured therein and slidably engaged in the oblong hole of the ear for limiting a relative movement of the slide relative to the ear and for preventing the slide from being disengaged from the lever.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a perspective view of the hacksaw;

FIG. 3 is a partial cross sectional view taken along lines 3—3 of FIG. 2;

FIG. 4 is a plane view of the hacksaw; and

FIG. 5 is a partial plane view illustrating the operation of the hacksaw.

DETAILED DESCRIPTION OF THE PREFERRED EMBODIMENT

Figure 1:
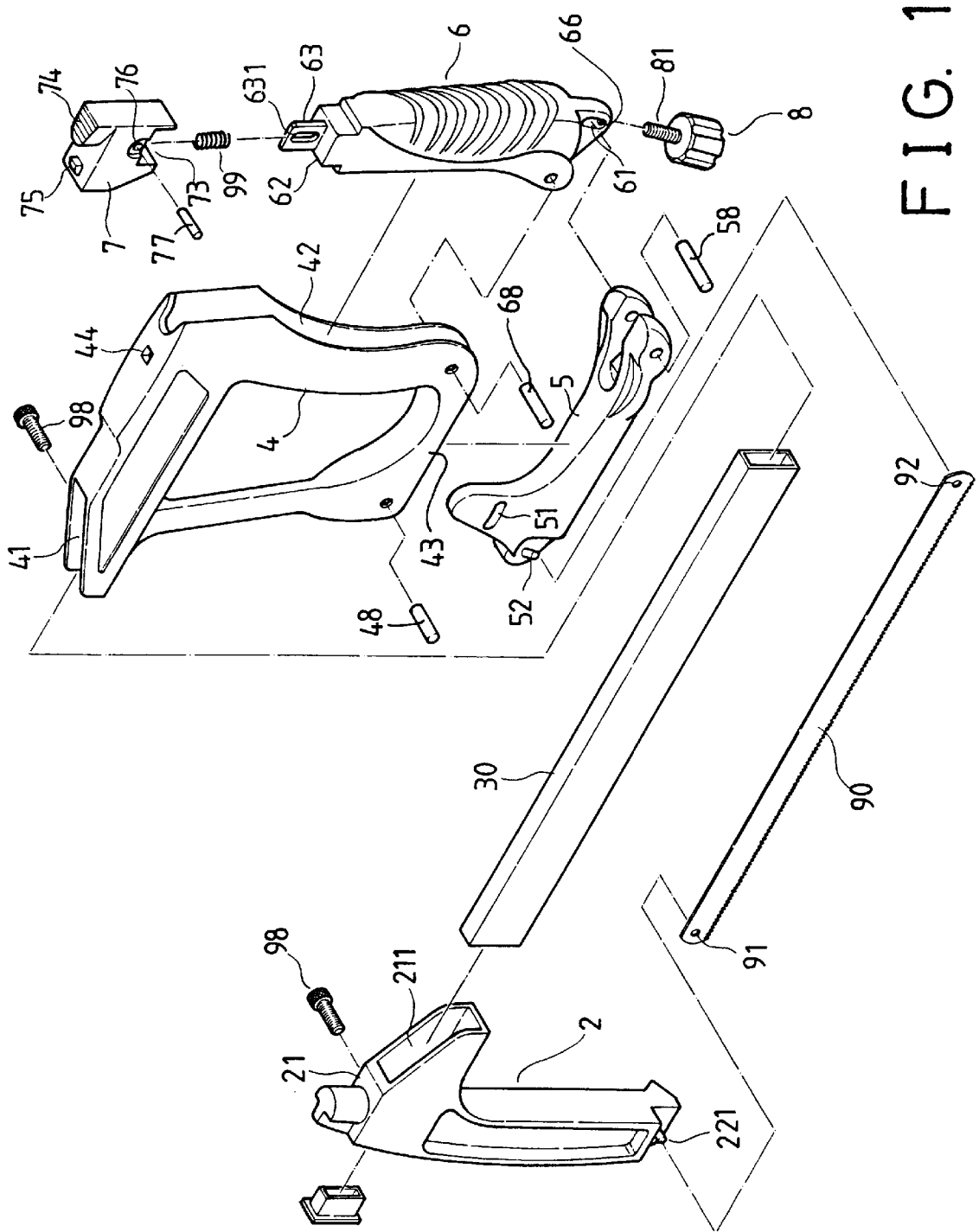
FIG. 1 is an exploded view of a hacksaw in accordance with the present invention.

Referring to the drawings, and initially to FIGS. 1–4, a hacksaw in accordance with the present invention comprises a body including a frame 2 provided in the front portion and having an upper portion 21 having a lateral channel 211 for engaging with one end of a beam 30 and having a lower portion having a projection 221 for engaging with one end hole 91 of a blade 90. A handle 4 includes a lateral channel 41 formed in the upper portion for engaging with the other end of the beam 30 and includes a bottom recess 43 and a rear recess 42 and an aperture 44 formed in the upper portion. The beam 30 is secured to the frame 2 and the handle 4 by fasteners 98 for forming the hacksaw body.

A lever 6 includes a lower portion pivotally coupled to the lower portion of the handle 4 at a shaft 68 for allowing the lever 6 to be rotated about the shaft 68 and for allowing the lever 6 to be engaged in the rear recess 42 of the handle 4. The lever 6 includes an ear 63 extended upward from the upper portion 62 and having an oblong hole 631. A slide 7 includes a lateral orifice 76 for engaging with a pin 77 and includes a cavity 73 formed in the bottom for engaging with the upper portion 62 of the lever 6 and includes a latch 75 for engaging with the aperture 44 of the handle 4. The pin 77 is slidably engaged in the oblong hole 631 of the ear 63 for guiding the slide 7 to move up and down and for limiting the upward and downward moving stroke of the slide 7 relative to the lever 6. The slide 7 includes a slot 72 for slidably engaging with the ear 63 and includes a depression 71 for receiving a spring 99 which is biased between the ear 63 and the slide 7 for biasing a button 74 of the slide 7 partially upward beyond the handle 4 and for allowing the slide 7 to be depressed downward against the spring 99. The spring 99 may bias the latch 75 of the slide 7 to engage with the aperture 44 of the handle 4 for securing the lever 6 to the handle 4.

The lever 6 includes an oblong hole 61 formed in the bottom portion and includes a screw hole 66 communicating with the oblong hole 61 for threadedly engaging with a bolt 81 which includes a knob 8 secured to the bottom for rotating the bolt 81. A link 5 includes a rod 58 secured to one end and slidably engaged in the oblong hole 61 of the lever 6, and includes a projection 52 provided on the other end for engaging with the other end hole 92 of the blade 90. The link 5 further includes a lateral oblong hole 51 for slidably engaging with a pole 48 which is secured in the bottom portion of the handle 4 and which may limit the forward and rearward movement of the link 5 relative to the handle 4. The bolt 81 may engage with the rod 58 for moving the rod 58 along the oblong hole 61 (FIG. 5).

In operation, as shown in FIG. 4, when the latch 75 of the slide 7 is disengaged from the aperture 44 by depressing the slide 7 against the spring 99, the lever 6 may be rotated about the shaft 68 and the link 5 may be moved forward for releasing the blade 90. At this moment, the blade 90 may be easily engaged and disengaged from the frame 2 and the handle 4. The blade 90 may be easily secured in place when the lever 6 is rotated about the shaft 68 until the latch 75 is engaged with the aperture 44 again. The oblong hole 61 is arranged for allowing the bolt 81 to move the rod 58 along the oblong hole 61 and for moving the link 5 in order to adjust the blade tension even when the blade 90 is secured in place by the lever 6.

It is to be noted that the engagement of the pole 48 with the oblong hole 51 is optional and is provided for preventing the link 5 from being disengaged from the handle 4. The link 5 may also be used for securing the blade 90 without the pole 48 and the oblong hole 51. The link 5 and the blade 90 is only required to be moved for a small distance for adjusting the blade to the best blade tension. The frame 2 and the beam 30 and the handle 4 may be formed as an integral member.

Accordingly, the hacksaw in accordance with the present invention includes a mechanism for easily adjusting the blade tension when the blade is secured in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hacksaw comprising:

a body including a front portion having a frame and a rear portion having a handle, said frame including a bottom portion, said handle including a bottom portion and an upper portion and a rear portion, a lever including a lower portion pivotally coupled to said bottom portion of said handle at a shaft and including an upper portion and a bottom portion, a link including a first end pivotally secured to said bottom portion of said lever at a rod and including a second end, a blade secured to said second end of said link and said bottom portion of said frame, said blade being secured in place when said lever is rotated about said shaft to engage with said rear portion of said handle and said blade being released when said lever is disengaged from said rear portion of said handle, means for securing said upper portion of said lever to said handle and for securing said blade in place, and means for moving said link relative to said lever for adjusting a blade tension of said blade when said lever secures said blade in place.

2. The hacksaw according to claim 1, wherein said bottom portion of said lever includes an oblong hole for slidably engaging with said rod, said link moving means includes a forcing means for forcing said rod along said oblong hole and for adjusting the blade tension of said blade.

3. The hacksaw according to claim 2, wherein said rod forcing means includes a bolt threadedly engaging with said bottom portion of said lever and engaged with said rod for moving said rod along said oblong hole.

4. The hacksaw according to claim 1, wherein said bottom portion of said handle includes a pole, said link includes an oblong hole for slidably engaging with said pole of said handle and for limiting a relative movement of said link relative to said handle and for preventing said link from being disengaged from said handle.

5. The hacksaw according to claim 1, wherein said lever securing means includes a slide slidably engaged on said upper portion of said lever, and means for biasing said slide to engage with said handle and for securing said lever to said handle.

6. The hacksaw according to claim 5, wherein said lever includes an ear extended upward, said handle includes an aperture, said slide includes a latch for engaging with said aperture of said handle and includes a slot for slidably engaging with said ear of said lever, said biasing means is engaged between said ear and said slide for biasing said latch to engage with said aperture and for securing said lever to said handle.

7. The hacksaw according to claim 6, wherein said ear of said lever includes an oblong hole, said slide includes a pin secured therein and slidably engaged in said oblong hole of said ear for limiting a relative movement of said slide relative to said ear and for preventing said slide from being disengaged from said lever.

* * * * *